US011930878B2

(12) United States Patent
Blomqvist

(10) Patent No.: US 11,930,878 B2
(45) Date of Patent: Mar. 19, 2024

(54) HEADSET FOR A HELMET

(71) Applicant: Savox Communications Oy Ab (Ltd), Espoo (FI)

(72) Inventor: Mikko Blomqvist, Klaukkala (FI)

(73) Assignee: Savox Communications Oy Ab (Ltd), Espoo (FI)

( * ) Notice: Subject to any disclaimer, the term of this patent is extended or adjusted under 35 U.S.C. 154(b) by 637 days.

(21) Appl. No.: 17/253,144

(22) PCT Filed: Jun. 19, 2019

(86) PCT No.: PCT/EP2019/066210
§ 371 (c)(1),
(2) Date: Dec. 17, 2020

(87) PCT Pub. No.: WO2019/243424
PCT Pub. Date: Dec. 26, 2019

(65) Prior Publication Data
US 2021/0267300 A1 Sep. 2, 2021

(30) Foreign Application Priority Data
Jun. 21, 2018 (EP) .................................... 18178941

(51) Int. Cl.
*H04R 1/08* (2006.01)
*A42B 3/30* (2006.01)
*H04R 1/10* (2006.01)

(52) U.S. Cl.
CPC ............... *A42B 3/30* (2013.01); *H04R 1/083* (2013.01); *H04R 1/1041* (2013.01)

(58) Field of Classification Search
CPC .... H04R 1/1041; H04R 1/083; H04R 5/0335; H04R 2201/10; H04R 25/606; A42B 3/30
See application file for complete search history.

(56) References Cited

U.S. PATENT DOCUMENTS

2006/0286933 A1 12/2006 Harkins et al.
2012/0052924 A1 3/2012 Cybart et al.
2013/0089229 A1* 4/2013 Kristo .................... H04R 1/105 381/326
2019/0253786 A1* 8/2019 Nakao ...................... H04R 1/14

FOREIGN PATENT DOCUMENTS

DE 102013011195 A1 1/2015
JP H04357798 A 6/1991
JP 2002350771 A 12/2002
(Continued)

OTHER PUBLICATIONS

Notice of Reasons for Rejection dated Apr. 4, 2023 issued in corresponding Japanese Patent Application No. 2020-569977.
(Continued)

*Primary Examiner* — Sunita Joshi
(74) *Attorney, Agent, or Firm* — ARENTFOX SCHIFF LLP

(57) ABSTRACT

The invention relates to a headset for a helmet. The headset comprises a speaker unit, a boom microphone and a skull microphone. The headset further comprises a switch configured to activate the boom microphone or the skull microphone based on the position of the boom microphone. The invention relates also to a helmet comprising the headset.

8 Claims, 7 Drawing Sheets

(56) References Cited

FOREIGN PATENT DOCUMENTS

| | | | | | |
|---|---|---|---|---|---|
| WO | 9945686 | A1 | | 9/1999 | |
| WO | WO-9945686 | A1 | * | 9/1999 | .............. H04M 1/05 |
| WO | 2008010826 | A1 | | 1/2008 | |
| WO | 2018046637 | A1 | | 3/2018 | |
| WO | 2018/079575 | A1 | | 5/2018 | |

OTHER PUBLICATIONS

European Search Report dated May 19, 2021 issued in European counterpart application No. EP18178941.3.

* cited by examiner

HEADSET FOR A HELMET

PRIORITY

This application is a U.S. national application of the international application number PCT/EP2019/066210 filed on Jun. 19, 2019 and claiming priority of European application number 18178941.3 filed on Jun. 21, 2018, the contents of all of which are incorporated herein by reference.

TECHNICAL FIELD

The invention concerns in general the technical field of headsets. Especially the invention concerns headsets for helmets.

BACKGROUND

Typically, a headset comprises a speaker unit, such as headphones, and a microphone, such as boom microphone, skull microphone based on bone conduction for conducting sound through the bones of the skull, throat microphone based on actuation by vibrations of larynx, etc. The headset is a common accessory to helmets or protective headgear of type worn by professional personnel working in potentially hazardous conditions such as firefighters, airline pilots, military personnel, policemen, etc. Moreover, people working in noisy environments such as factories or construction sites may have a headset mounted in a protective headgear they may wear while working. Yet further, a headset enables hands-free telecommunication when further connected e.g. to a mobile phone or to a computer, which results in a wide range of usage scenarios including professional and everyday use.

For certain use cases, especially on the professional side, sound quality of certain type of microphone is worse than other type of microphones. For example, when a firefighter is wearing a breathing mask, e.g. during smoke diving, the skull microphone or throat microphone may provide better sound quality than the boom microphone, although the boom microphone may provide better sound quality in many other use cases.

According to one prior art solution the microphone of the headset may be changed depending on the use case. At least one drawback of the prior art solution is that the user has to carry several different types of microphones with him/her. Furthermore, the change between different type of microphones is time-consuming, because first the current microphone must be detached from the headset and after that the other microphone must be attached to the headset.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a headset for a helmet and a helmet comprising a headset. Another objective of the invention is that the headset for a helmet and the helmet comprising the headset enable simply and easy switching between a boom microphone and the skull microphone depending on the use case.

The objectives of the invention are reached by a headset and a helmet as defined by the independent claims.

According to a first aspect, a headset for a helmet is provided, wherein the headset comprises a speaker unit, a boom microphone and a skull microphone, wherein the headset further comprises a switch configured to activate the boom microphone or the skull microphone based on the position of the boom microphone.

Moreover, the switch may be configured to: activate the boom microphone and simultaneously deactivate the skull microphone, when the boom microphone is arranged to a use position; and deactivate the boom microphone and simultaneously activate the skull microphone, when the boom microphone is arranged to a non-use position.

The boom microphone may comprise a rotating element enabling that the boom microphone is movable between a plurality of positions of the boom microphone, wherein the rotating element is mechanically mountable to the speaker unit or to the helmet.

The headset may further comprise an actuator arranged to the rotating element, wherein when the boom microphone is in the use position, the actuator is far from the switch arranged to the speaker unit and the switch is in its first state, thereby causing that the switch is configured to connect the ground or signal of the boom microphone and disconnect the ground or signal of the skull microphone, respectively, to activate the boom microphone and deactivate the skull microphone; and when the boom microphone is in the non-use position, the actuator is in a close vicinity to the switch and the switch is in its second state, thereby causing that the switch is configured to disconnect the ground or signal of the boom microphone and connect the ground or signal of the skull microphone, respectively, to deactivate the boom microphone and activate the skull microphone.

The switch may be a reed switch and the actuator may be a magnet.

Alternatively or in addition, the switch may be an electromechanical switch, an optomechanical switch, or a mechanical switch, such as a micro switch or opto-switch, and the actuator may be a mechanical actuator.

The boom microphone may comprise a boom having a microphone arranged in its far end.

Furthermore, the boom microphone may be detachably mounted to the speaker unit or the helmet with mechanical coupling means.

The skull microphone may be fixedly coupled to the speaker unit.

According to a second aspect, a helmet is provided, wherein the helmet comprises the headset described above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
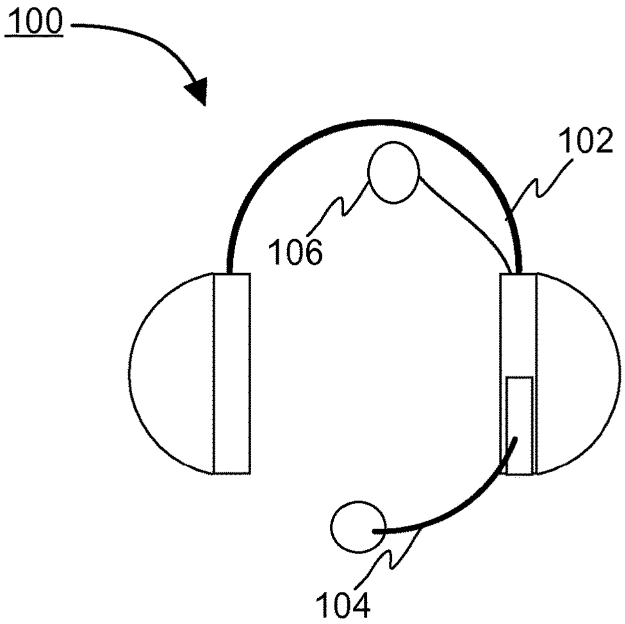
FIG. 1 schematically illustrates a headset according to a simple example.

FIG. 1 schematically illustrates some components of a headset 100 according to a simple example. The headset 100 may comprise a speaker unit 102, a boom microphone 104, and a skull microphone 106. As a few non-limiting examples, the speaker unit 102 may be headphones, earphones, earpiece, hearing protectors, etc. The skull microphone 106 may be fixedly coupled to the speaker unit 102 with a cable comprising a plurality of electrical wires arranged inside the cable in order to electrically couple the skull microphone 106 to the speaker unit 102. The skull microphone may be mechanically mountable to a helmet for example with a hook-and-loop fastened, such as Velcro, or with any other similar kind of mounting means.

Figure 2:
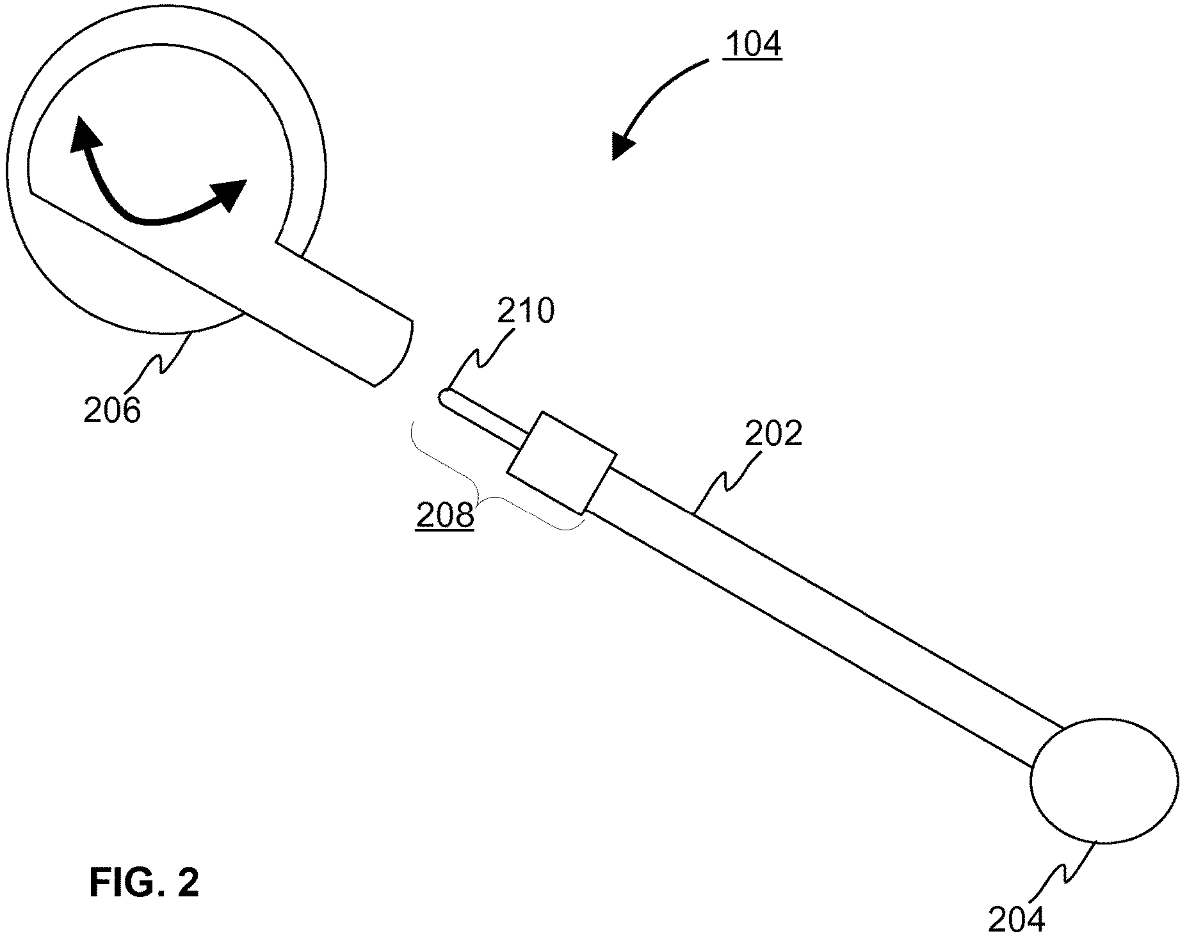
FIG. 2 schematically illustrates an exploded-view drawing of a boom microphone according to an example.

FIG. 2 schematically illustrates an exploded-view drawing of a boom microphone 104 according to an example. The boom microphone 104 comprises a boom 202 having a microphone 204 arranged in its far end. As a few non-limiting examples, the microphone 204 arranged in the far end of the boom 202 may be a dynamic microphone or an electret microphone using a single-ended or differential configuration. The boom microphone 104 further comprises a rotating element 206 to which the other end of the boom 202 may be mounted. The end of the boom 202 that has the microphone 204 arranged therein may be referred to as a far end whereas the other end of the boom 202 that is mountable to the rotating element 206 may be referred to as a near end. The boom 206 may comprise a mounting arrangement 208 in the near end of the boom 202 in order to mechanically and electrically couple the microphone 204 arranged in the far end of the boom 202 to the rotating element 206. The boom 202 having the microphone 204 may be detachably mounted to the rotating element 206. Alternatively, the boom 202 having the microphone 204 may be fixedly mounted to the rotating element 206.

Figure 3A:
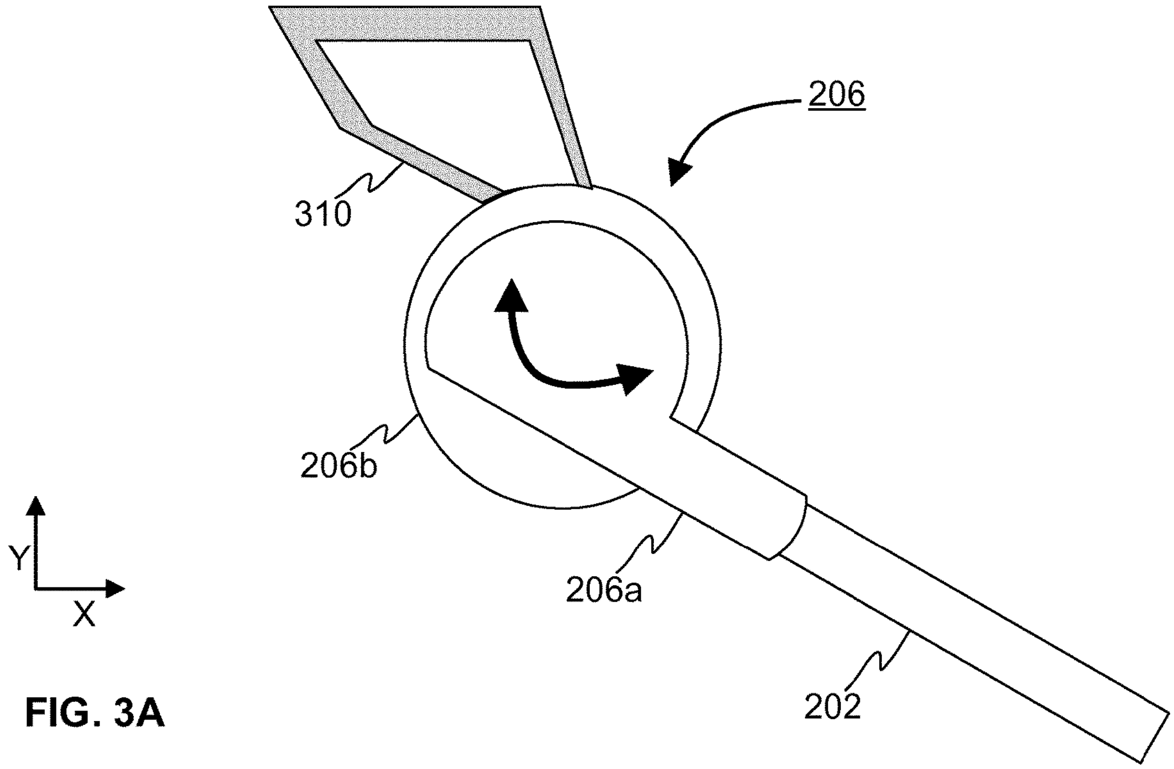
FIGS. 3A and 3B schematically illustrate examples of a rotating element of a boom microphone.
Figure 3B:
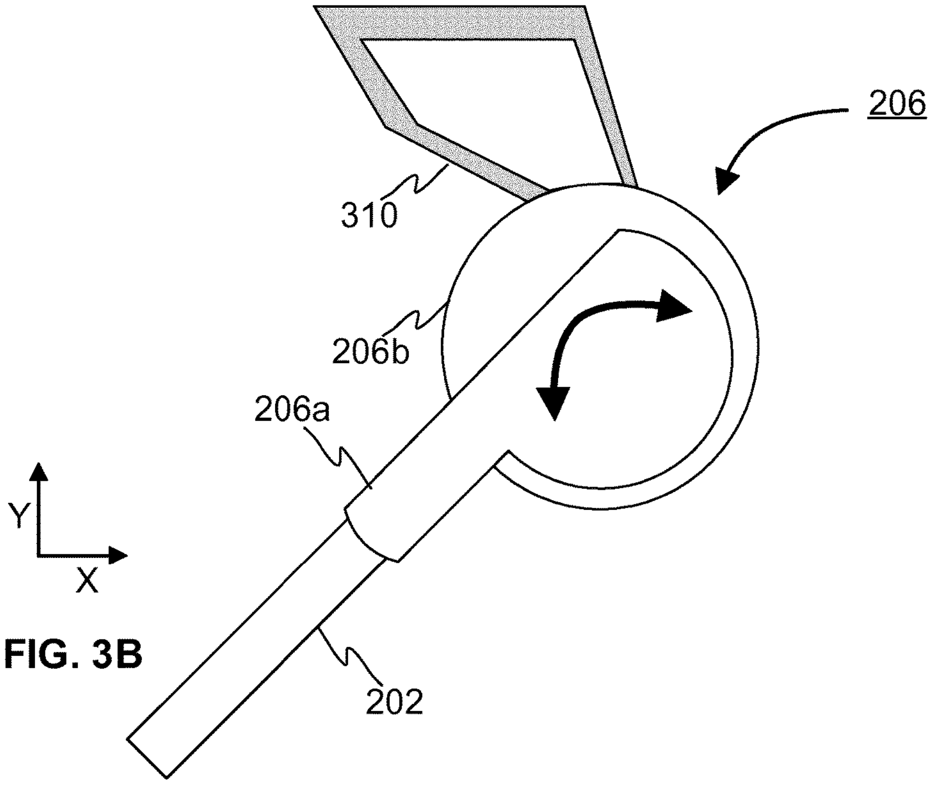

FIGS. 3A and 3B schematically illustrate examples of the rotating element 206 of the boom microphone 104. For sake of clarity the microphone 204 arranged in the far end of the boom 204 is not shown in FIGS. 3A and 3B. In FIGS. 3A and 3B the orientation of the rotating element 206 is such that, when the headset 100 is in use, i.e. worn by a user, the face of the user is facing substantially to the positive X-direction and the top of the head is facing substantially to the positive Y-direction. In case the headset 100 is arranged to a helmet the top of the helmet is facing substantially to the positive Y-direction and the opening in the helmet for the face of a user of the helmet is facing substantially to the positive X-direction (see FIGS. 6A and 6B). The rotating element 206 may be mechanically coupled, i.e. mounted, to the speaker unit 102 or to a helmet, to which the headset 100 may be mounted, with mechanical coupling means 310. In FIGS. 3A and 3B a non-limiting example of the mechanical coupling means 310 is illustrated with which the rotating element 206 may be hanged to the speaker unit 102, e.g. to an ear cup of headphones or an ear cup of a hearing protector. According to another non-limiting example the rotating element may be coupled to any type of helmet with a strap type mechanical coupling means 310. Alternatively, any other mechanical coupling means 310 may be used to mechanically couple the rotating element 206 to the speaker unit 102 or to the helmet.

The rotating element 206 enables that the boom microphone 104 is movable between a plurality of positions of the boom microphone 104. The movement of the boom microphone 104 provided by the rotating element 206 is rotating movement around the rotation axis of the rotating element 206. The rotation axis is perpendicular to the XY-plane. The rotating movement of the boom microphone 104 provided by the rotating element 206 may be continuous or stepped. The rotating element 206 enables that the boom microphone 104 is movable in both directions, i.e. in clockwise direction and in counter clockwise direction. The rotating element 206 may enable that the boom microphone 104 may be rotatable continuously or stepwise around the rotation axis of the rotating element 206. Alternatively, the rotating element 206 may enable that the boom microphone may be rotatable continuously or stepwise between two limit positions so that the boom microphone 104 is not allowed to rotate full 360 degrees. The rotating element 206 may comprise two parts **206*a*, 206*b* that may be rotated with respect to each other in order to move the boom microphone 104 mounted to the first part 206*a* of the rotating part 206 between a plurality of positions of the boom microphone 104. FIGS. 3A and 3B illustrate two different positions of the boom microphone 104 provided by rotating the rotating element 206. The second part 206*b* of the rotating element 206 may be mechanically coupled to the speaker unit 102 with the mechanical coupling means 310 causing that the second part 206*b* is stationary and the first part 206*a* is rotatable with respect to the second part 206*b*. The first part 206*a* may comprise a protruding part to which the boom 202 of the boom microphone 104** may be mounted.

In case the boom 202 is detachably mountable to the rotating element 206, the mounting arrangement 208 in the near end of the boom 202 may comprise an audio plug 210 and the rotating element 206 may be provided with a matching audio socket (not shown in the figures) for electrical coupling the microphone 204 arranged in the far end of the boom 202 to the rotating element 206. The audio plug 210 is secured to the near end of the boom 202 and is further electrically coupled to the microphone 204 in the far end of the boom 202, thereby electrically coupling the microphone 204 to the rotating element 206. The electrical coupling may be provided by a plurality of electrical wires arranged inside the boom 202, which electrical wires are electrically connected to the audio plug 210 in one end and to the microphone 204 in the other end. The applied or required number of electrical wires typically depends on the requirements of the employed microphone type and is hence selected accordingly. The audio socket may be provided to the protruding part of the first part **206*a* of the rotating element 206. The audio socket of the rotating element 206 is electrically coupled to further components of an audio processing arrangement within and/or outside the headset 100, such as the speaker unit 102, for example with a cable comprising a plurality of electrical wires arranged inside the cable. The audio plug 210 may be provided as a suitable audio connector known in the art, e.g. as a four-conductor or fiveconductor 3.5 mm audio plug, while the audio socket in the rotating element 206** is provided as a matching audio socket (audio jack).

In case the boom 202 is fixedly mounted to the rotating element 206, the microphone 204 in the far end of the boom 202, is electrically coupled to the rotating element 206 by a plurality of electrical wires arranged inside the boom 202. The rotating element 206 is electrically coupled to further components of an audio processing arrangement within and/or outside the headset 100, such as the speaker unit 102, for example with a cable comprising a plurality of electrical wires arranged inside the cable.

The headset 100 further comprises a switch 502 to activate the boom microphone 104 or the skull microphone 106 based on the position of the boom microphone 104. The switch 502 may activate the boom microphone 104 and simultaneously deactivate the skull microphone 106, when the boom microphone 104 is arranged in at least one use position. The switch 502 may deactivate the boom microphone 104 and simultaneously activate the skull microphone 106, when the boom microphone 104 is arranged in at least one non-use position. The use position of the boom microphone 104 may be for example such that the microphone 204 arranged in the far end of the boom 202 is substantially front of the mouth of the user, i.e. facing the mouth of the user. In case that the headset 100 is mounted to a helmet the use position of the boom microphone 104 is typically such that the microphone 204 arranged in the far end of the boom 202 is substantially at the front of the helmet. The non-use position of the boom microphone 104 may be for example a tilt position, wherein the boom 202 and/or the microphone 204 arranged in the far end of the boom 202 does not disturb the user, if the space around the use position of the boom microphone 104 is needed to be free or is occupied for some other entity, for example for breathing mask. One non-limiting example of the non-used position is a position, wherein the boom microphone 104, i.e. the boom 202 and/or the microphone 204 arranged in the far end of the boom 202, is arranged substantially behind the neck of the user or towards the back portion of a helmet, if the headset 100 is arranged to a helmet. Alternatively or in addition, the non-used position of the boom microphone 104 may be a position, wherein the boom microphone 104, i.e. the boom 202 and/or the microphone 204 arranged in the far end of the boom 202, is arranged substantially towards the top of the head of the user or towards the top of the helmet, if the headset 100 is arranged to a helmet, i.e. substantially to the direction of the positive Y-direction in Figures.

Preferably, in case the rotating element 206 enables that the boom microphone may be rotatable continuously or stepwise between two limit positions, the use position may be arranged at the first limit position and the non-use position may be arranged at the second limit position. Alternatively or in addition, the use position and/or the non-use position may be arranged to be any other position between the two limit positions. For example, in case the rotating movement of the boom microphone 104 provided by the rotating element 206 is stepwise movement and the boom microphone 104 may be configured to be movable between at least two positions, i.e. at least between the limit positions, the use position may be arranged at least at the first limit position and the non-use position may be arranged at the second limit position. For example, if the rotating element 206 has three stepped positions between which the boom microphone 104 may be movable, the first limit position and the position between the limit positions may be the use positions and the second limit position may be the non-use position. According to another example, if the rotating element 206 has three stepped positions between which the boom microphone 104 may be movable, the first limit position may be the use position and the second limit position and the position between the limit positions may be the non-use positions. The invention is not limited to the example number of stepped positions of the rotating element 206 described above and any number of stepped positions may be used.

Figure 4A:
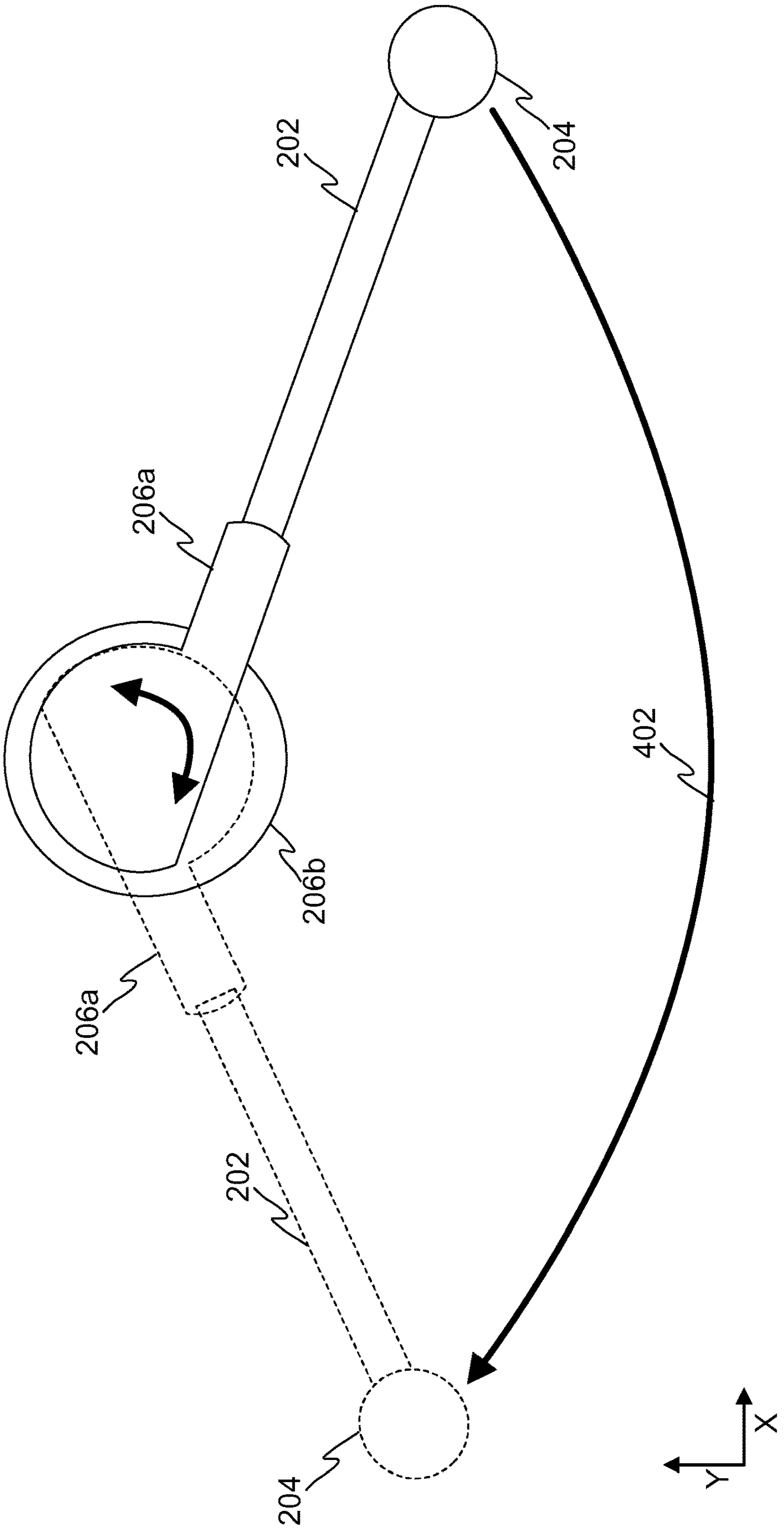
FIGS. 4A and 4B schematically illustrate an example of use position of a boom microphone and non-use position of a boom microphone.
Figure 4B:
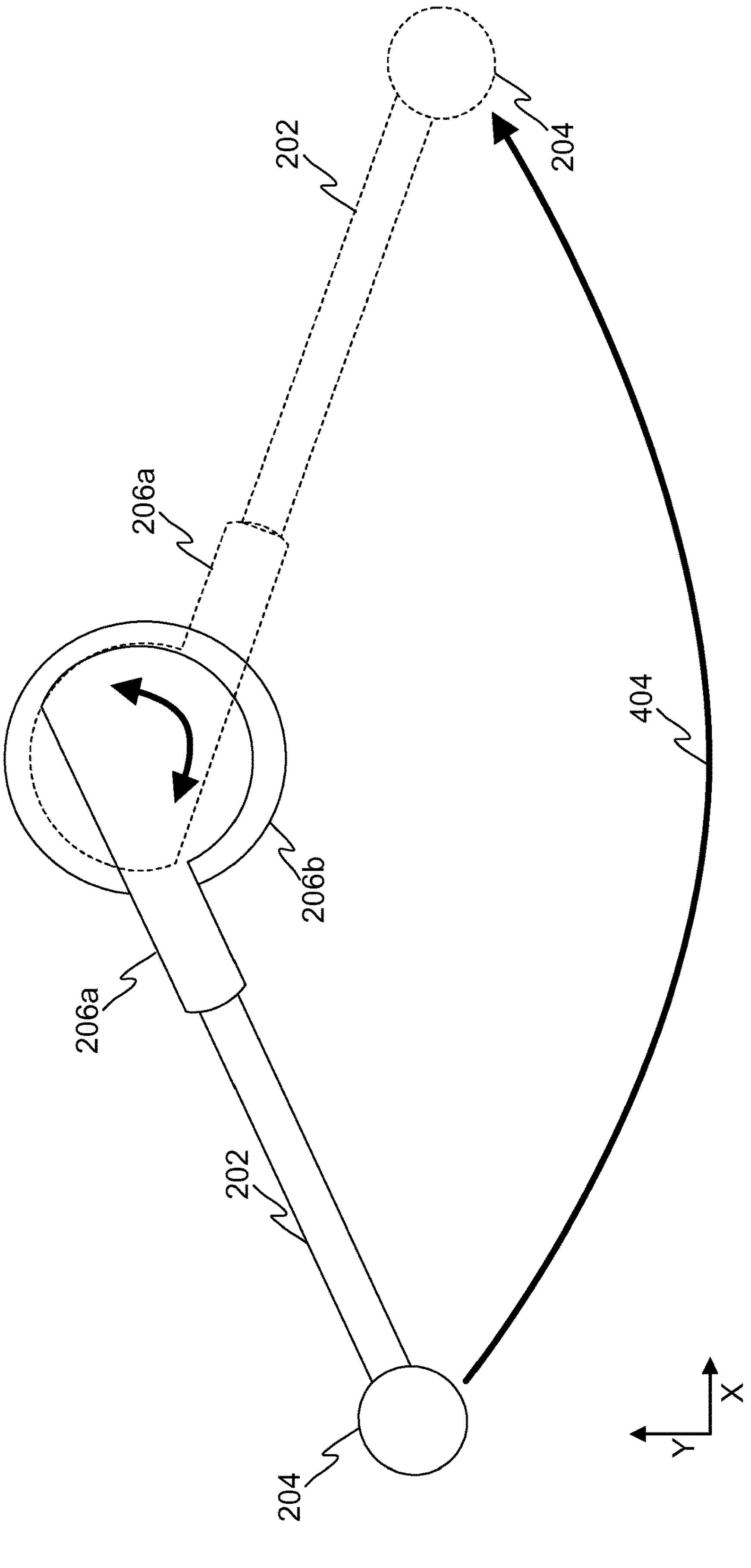

FIGS. 4A and 4B illustrate a non-limiting example of the use position of the boom microphone 104 and the non-use position of the boom microphone. In FIGS. 4A and 4B the orientation of the rotating element 206 is such that, when the headset 100 is in use, i.e. worn by a user, the face of the user is facing substantially to the positive X-direction and the top of the head of the user is facing substantially to the positive Y-direction. In case the headset 100 is arranged to a helmet, the top of the helmet is facing substantially to the positive Y-direction and the opening in the helmet for the face of a user of the helmet is facing substantially to the positive X-direction (see FIGS. 6A and 6B). In FIG. 4A the boom microphone is first in the use position, e.g. substantially in the front of the mouth of the user, and the boom microphone 104 may be used. In the use position of the boom microphone 104, the boom microphone 104 is active and the skull microphone is deactivated. In a use case, where the skull microphone would be more suitable than the boom microphone, the user may rotate the boom microphone 104 from the use position, e.g. from the front of the mouth of the user, to the non-use position, e.g. behind the neck of the user, in order to activate the skull microphone and deactivate the boom microphone 104. In FIG. 4A the boom microphone 104 illustrated with solid lines represents the boom microphone 104 in the use position and the boom microphone 104 illustrated with dashed lines represents the boom microphone 104 in the non-use position. The arrow 402 in FIG. 4A illustrates the movement direction of the boom microphone 104 from the use position to the non-use position, wherein the movement of the boom microphone 104 provided by the rotating element 206 is rotating movement around the rotation axis of the rotating element 206. According to an example, the use position may be the first limit position and the non-use position may be the second limit position as discussed above, i.e. the boom microphone may be moved between the first and second limit positions.

In the example illustrated in FIG. 4B the boom microphone 104 is first in the non-use position, e.g. behind the neck of the user, and the skull microphone 102 may be used. In the non-use position of the boom microphone 104, the skull microphone 106 is active and the boom microphone 104 is deactivated. In a use case, where the boom microphone 104 would be more suitable than the skull microphone 106, the user may turn the boom microphone 104 from the non-use position, e.g. from behind the neck of the user, to the use position, e.g. to substantially front of the mouth of the user in order to activate the boom microphone 104 and deactivate the skull microphone 102. In FIG. 4B the boom microphone 104 illustrated with solid lines represents the boom microphone 104 in the non-use position and the boom microphone 104 illustrated with dashed lines represents the boom microphone 104 in the use position. The arrow 404 in FIG. 4B illustrates the movement direction of the boom microphone 104 from the non-use position to the use position, wherein the movement of the boom microphone 104 provided by the rotating element 206 is rotating movement around the rotation axis of the rotating element 206.

The switch 502 may be arranged to the speaker unit 102. The switch 502 may be used to connect and disconnect grounds or signals of the boom microphone 104 and the skull microphone 106 in order to activate the boom microphone 104 or the skull microphone 106 based on the position of the boom microphone 104. The headset 100 may further comprise an actuator 504 that may be arranged to the rotating element 206 of the boom microphone 104 in order to enable the that the switch 502 may be used to activate the boom microphone 104 or the skull microphone 106 based on the position of the boom microphone 104. The actuator 504 may be a separate part that may be fixed to the rotating element 206. Alternatively, the actuator 504 may be an integral part of the rotating element 206.

The actuator 504 may be arranged to the rotating element 206 so that the switch 502 may activate the boom microphone 104, when the boom microphone is in its use position, and activate the skull microphone 106, when the boom microphone 104 is in its non-use position. This may be provided so that the actuator 504 is arranged to the first part 206*a* of rotating element 206, e.g. to the protruding part (as illustrated in FIGS. 5A-5D), that is movable with respect to the speaker unit 102 to which the switch 502 may be arranged. The switch 502, in turn, may be arranged to the speaker unit 102 so that when the boom microphone 104 is in the non-use position, the actuator 504 arranged to the rotating element 206 is in a close vicinity of the switch 502, i.e. the actuator 504 is within an operational area of the switch 502 to enable that the state of the switch 502 may change.

According to an example, the switch may be a reed switch that is a passive mechanical switch, which state (open or closed) may be changed by applying a magnetic field. For example, the reed switch may be normally open and when a magnetic field is present the switch is closed or vice versa. The magnetic field may be applied by arranging a magnet, i.e. the actuator, in a close vicinity of the switch to change the state of the reed switch, i.e. from open to closed or closed to open. The state of the reed switch is changed back by moving the magnet away from the reed switch causing that the magnetic field ceases. The use of the reed switch as the switch 502 and the magnet as the actuator 504 enables a simple mechanical switching solution.

Alternatively, the switch 502 may be for example an electromechanical switch, an optomechanical switch, or a mechanical switch, such as a micro switch or optoswitch. If the switch 502 is an electromechanical switch, an optomechanical switch or mechanical switch, the actuator 504 may be a mechanical actuator. In case of electromechanical switch and micro switch the state of the switch may be changed by arranging the mechanical actuator, e.g. mechanical part, to press the switch. In case of optoelectrical switch and optoswitch the state of the switch may be changed by arranging the mechanical actuator, e.g. mechanical part, so that it switches of the beam of light.

Examples of the operation of the switch 502 are illustrated in FIGS. 5A-5D, wherein two non-limiting example locations of the switch 502 are presented. In FIGS. 5A-5D the orientation of the rotating element 206 is such that, when the headset 100 is in use, i.e. worn by a user, the face of the user is facing substantially to the positive X-direction and the top of the head of the user is facing substantially to the positive Y-direction. In case the headset 100 is arranged to a helmet, the top of the helmet is facing substantially to the positive Y-direction and the opening in the helmet for the face of a user of the helmet is facing substantially to the positive X-direction (see FIGS. 6A and 6B).

Figure 5A:
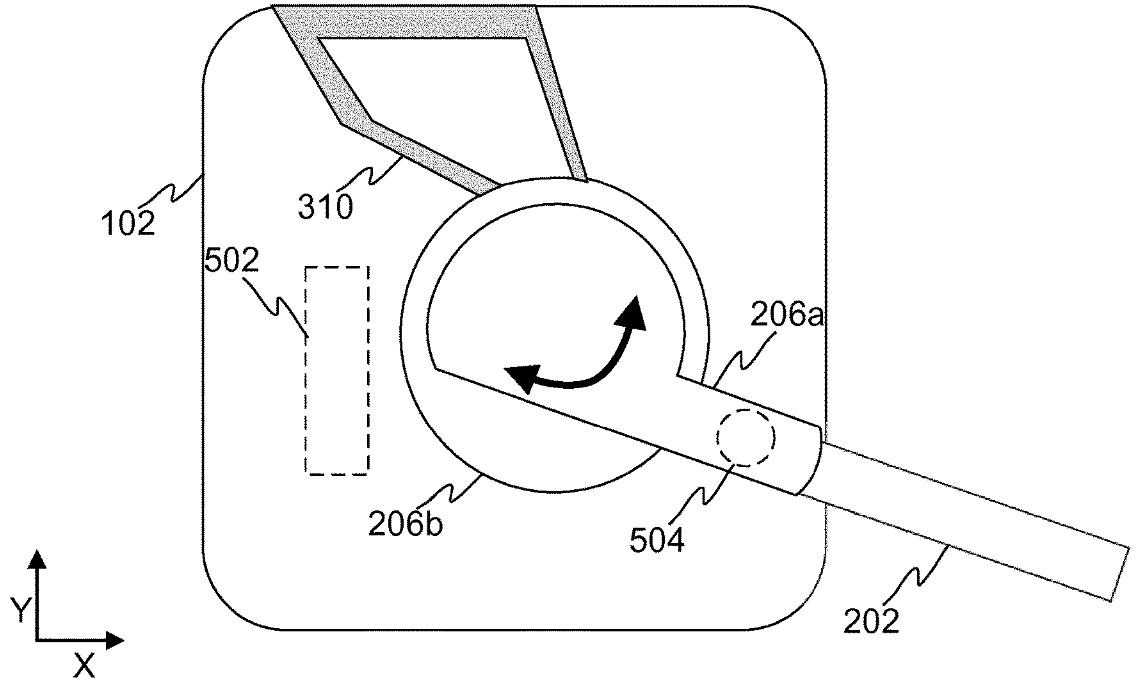
FIGS. 5A-5D schematically illustrate operation of a switch of a headset.
Figure 5B:
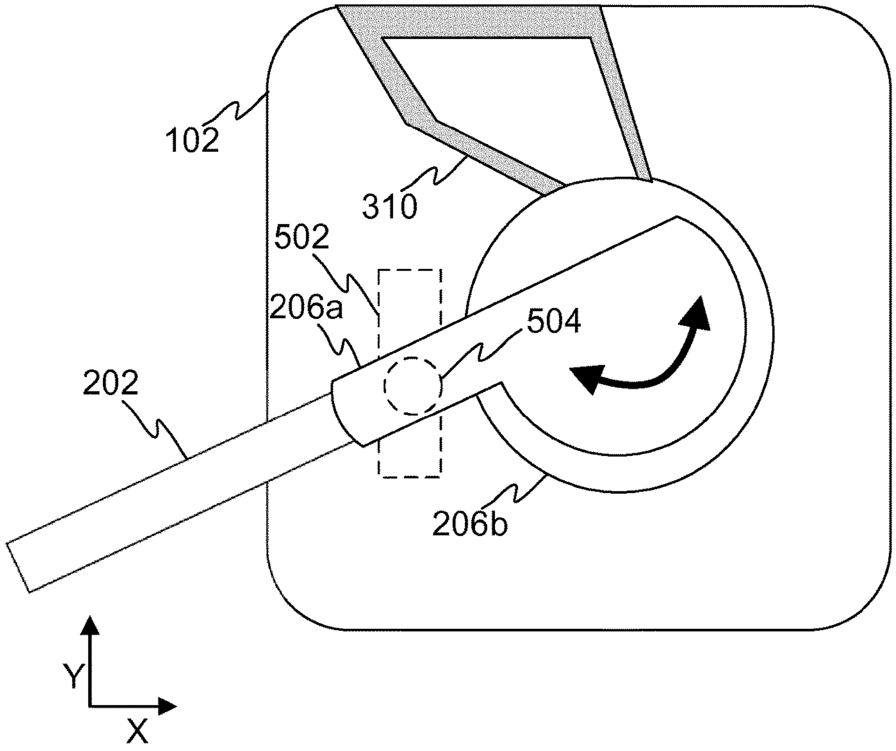

FIGS. 5A and 5B illustrate an example, wherein the switch 502 is arranged substantially behind the rotating element 206 in X-direction causing that the in the non-use position the boom microphone 104 is arranged substantially behind the neck of the user or towards the back portion of a helmet, if the headset 100 is arranged to a helmet. In FIG. 5A the boom microphone 104 is in the use position and the switch 502 and the actuator 504 are far away from each other, which means that the actuator 504 is outside the operational area of the switch 502. For example, in case of the reed switch 502 it means that the reed switch is not affected by the magnet so there is no magnetic field present around the reed switch and the reed switch is in its first state, i.e. normal state. In this case, the switch 502 connects the ground or signal of the boom microphone 104 and disconnect the ground or signal of the skull microphone 106, respectively. In FIG. 5B the boom microphone 104 is in the non-use position and the actuator 504 is in a close vicinity of the switch 502, which means that the actuator 504 is within the operational area of the switch 502. For example, in case of the reed switch it means that the reed switch is affected by the magnet so there is magnetic field present around the reed switch and the reed switch is in its second state. In this case, the switch 502 disconnects the ground or signal of the boom microphone 104 and connect the ground or signal of the skull microphone 106, respectively. When the ground of a microphone is connected, said microphone is active and when the ground of a microphone is disconnected, said microphone is deactivated.

Figure 5C:
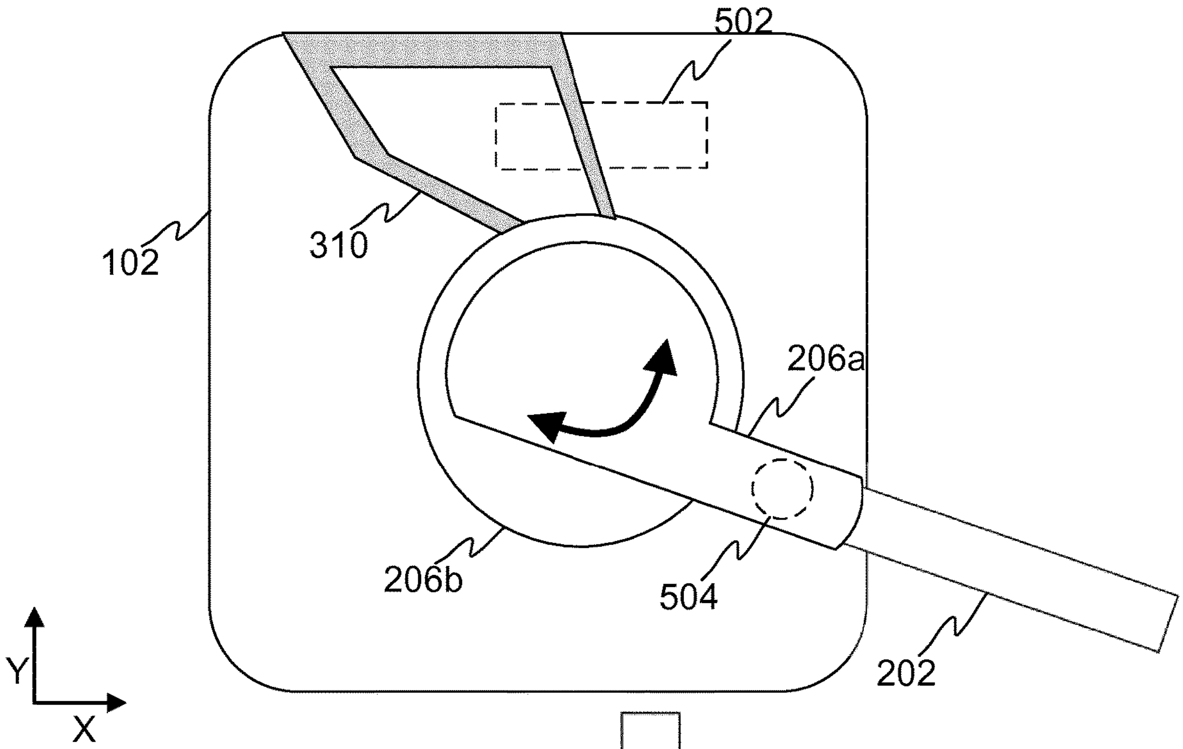
Figure 5D:
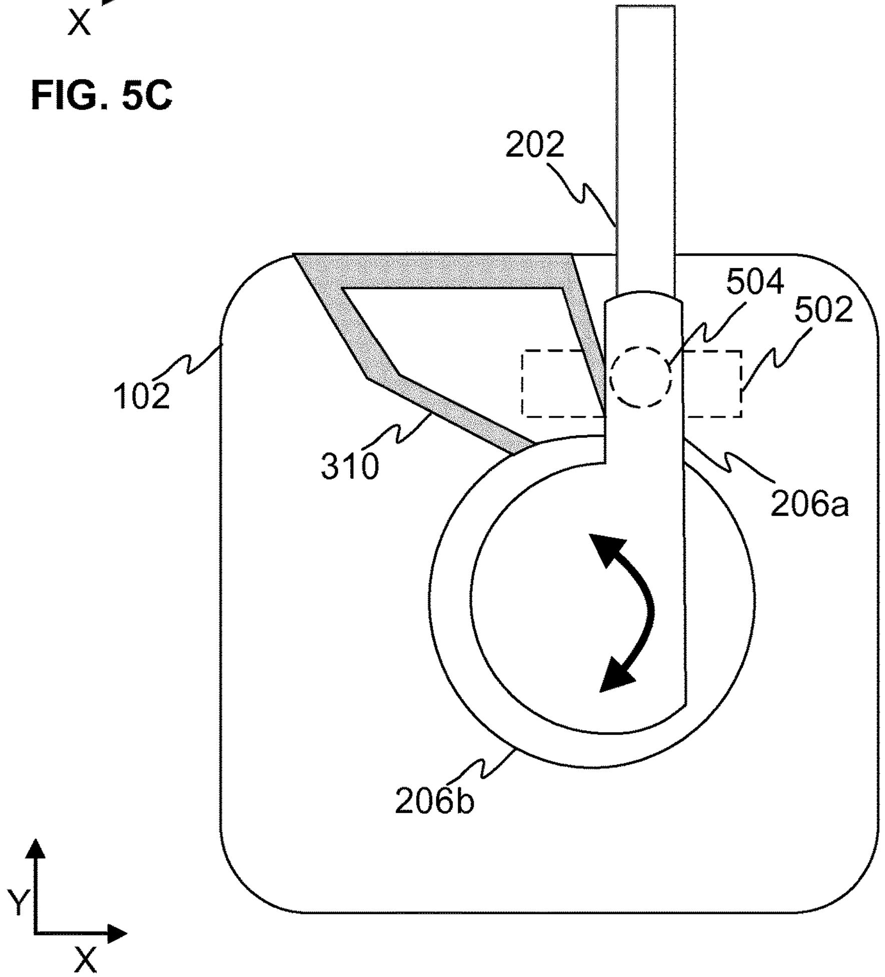

FIGS. 5C and 5D illustrates another example, wherein the switch 502 is arranged substantially on top the rotating element 206 (in Y-direction) causing that in the non-used position of the boom microphone 104 is arranged substantially towards the top of the head of the user or towards the top of the helmet, if the headset 100 is arranged to a helmet. In FIG. 5C the boom microphone 104 is in the use position and the switch 502 and the actuator 504 are far away from each other, which means that the actuator 504 is outside the operational area of the switch 502. In this case, the switch 502 connects the ground or signal of the boom microphone 104 and disconnect the ground or signal of the skull microphone 106, respectively. In FIG. 5D the boom microphone 104 is in the non-use position and the actuator 504 is in a close vicinity of the switch 502, which means that the actuator 504 is within the operational area of the switch 502. In this case, the switch 502 disconnects the ground or signal of the boom microphone 104 and connect the ground or signal of the skull microphone 106, respectively.

From the examples illustrated in FIGS. 5A-5D it may be seen that the location of the switch 502 defines the non-use position of the boom microphone 104. The switch 502 and the actuator 504 should be arranged to the headset 100 so that they may provide the switching, i.e. actuation or selection, between the boom microphone 104 and skull microphone 106 at a desired non-use position of the boom microphone 104. In other words, the non-use position of the boom microphone 104 may be almost any position of the boom microphone 104 that may be provided with the rotating element 206 and the non-use position may be defined by arranging the actuator 504 and the switch 502 to the different components of the headset 100 so that the actuator 504 causes that the switch changes its state at said location, for example in case of reed switch by arranging the magnet and the reed switch to the different components of the headset 100 so that the magnet causes magnetic field to the switch 502 at said location. In case the rotating element 206 rotates the boom microphone 104 stepwise, the switch 502 may be arranged to a location that corresponds one of the stepped positions of the rotating element 206. For example, if the rotating element 206 has three stepped positions between which the boom microphone 104 may be movable, the first limit position and the position between the limit positions may be the use positions and the second limit position may be the non-use position, thus the switch 502 may be arranged to the location that corresponds the second limit position. Preferably, the non-use position of the boom microphone 104 is such that the boom 202 and/or the microphone 204 arranged in the far end of the boom 202 does not disturb the user, if the space around the normal use position of the boom microphone 104 is needed to be free or is occupied for some other entity, for example for breathing mask. For sake of clarity the microphone 204 arranged in the far end of the boom 204 is not shown in FIGS. 5A-5D.

According to one example, the headset 100 may comprise at least two switches to provide at least two optional non-use positions of the boom microphone 104. For example, the headset 100 may comprise one switch arranged to a first location, e.g. to the example location illustrated in FIGS. 5A and 5B, to define a first non-use position of the boom microphone 104 and another switch arranged to a second location, e.g. to the example location illustrated in FIGS. 5C and 5D to define a second non-use position of the boom microphone 104. This enables that the boom microphone 104 may be moved, i.e. rotated, either to the first non-use position or to the second non-use position to activate the skull microphone 106 and deactivate the boom microphone 104 similarly as discussed above with one non-use position. Alternatively or in addition, the second switch, i.e. the second non-use position may be arranged to a location between the use position and the first non-use position.

The headset 100 described above may be mounted or arranged to a helmet, e.g. a firefighter helmet, military helmet, police helmet, etc. For example, when the headset 100 is arranged to a firefighter helmet, the headset 100 enables that the firefighter may easily switch between the boom microphone 104 and skull microphone only by moving, i.e. rotating around the rotation axis of the rotating element 206, the boom microphone 104 from the use position to the non-use position or from the non-use position to the use-position. This allows that when the firefighter is wearing e.g. a breathing mask, the skull microphone 106 may be activated by moving the boom microphone 104 from the use position to the non-use position or the boom microphone 104 may be activated by moving the boom microphone 104 from the non-use position to the use position.

Figure 6B:
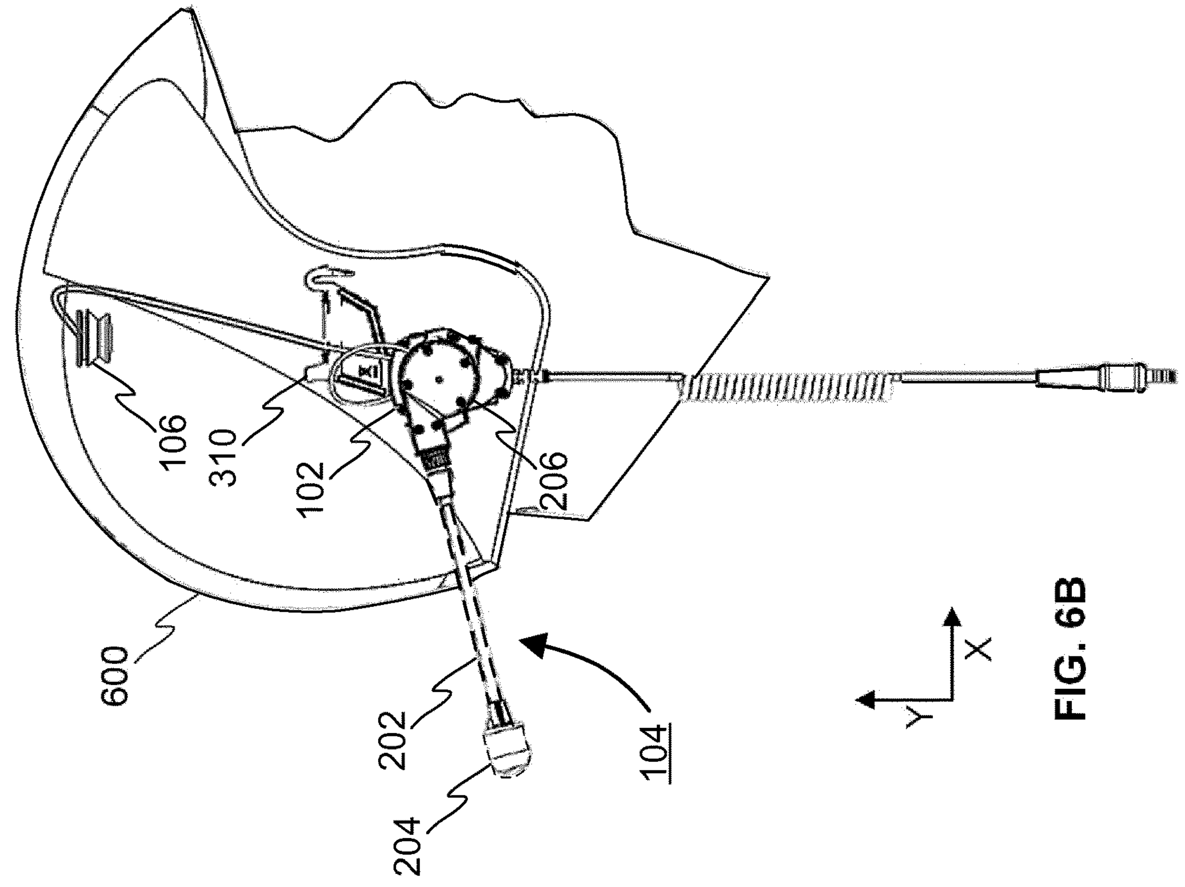
FIGS. 6A and 6B illustrate an example of a headset arranged to a helmet.
Figure 6A:
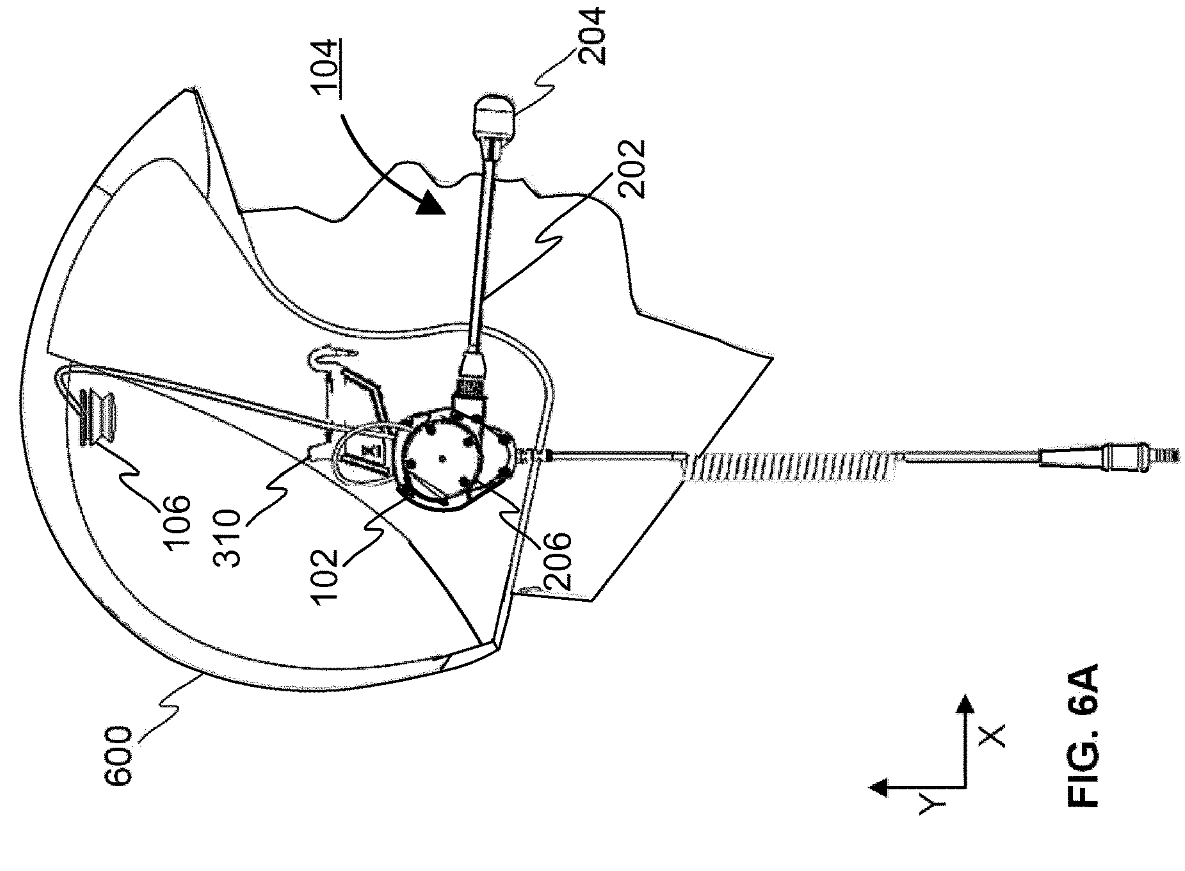

FIGS. 6A and 6B illustrate an example, wherein the headset 100 is arranged to a helmet 600. The speaker unit 102, the skull microphone 102 and the rotating element 206 of the boom microphone 104 are arranged inside the helmet 600. In FIG. 6A the boom microphone 104 arranged in a use position causing that the boom microphone 104 is activated. The use position of the boom microphone 104 in FIG. 6A is such that the microphone 204 arranged in the far end of the boom 202 is substantially front of the mouth of the user, i.e. facing the mouth of the user. In FIG. 6B the boom microphone 104 is arranged in a non-use position causing that the skull microphone 106 is activated. The non-use position of the boom microphone 104 in FIG. 6B is such that the microphone 204 arranged in the far end of the boom 202 is substantially behind the neck of the user.

For sake of simplicity the boom 202 is illustrated as a straight tube in FIGS. 2-6, but, the boom 202 may be provided as a deformable tube that may be bent by a user to enable adjusting the microphone 204 arranged in the far end of the boom 202 to a desired position with respect to himself/herself and/or with respect to the speaker unit 102 or the helmet 600. Alternatively, the boom 202 may comprise at least one deformable tube section that is bendable by a user and at least one rigid tube section or substantially rigid tube section to enable adjusting the microphone 204 arranged to the far end of the boom 202 to a desired position with respect to the user and/or with respect to the speaker unit 102 or the helmet 600. The above described adjustment of the position of the boom microphone 104, i.e. bending of the boom 202 of the boom microphone 104, enabled by at least partly the deformable tube of the boom 202 is not considered as a movement of the boom microphone 104 based on which the switch 502 may activate the boom microphone 104 or the skull microphone 106. Said adjustment of the position of the boom microphone 104, i.e. bending of the boom 202 of the boom microphone 104, may be provided, when the boom microphone 104 is in its use position. The boom 202 may be bent into a suitable, typically curved shape to bring the microphone 204 arranged in the far end of the boom 202 a desired position. Alternatively or in addition, the adjustment of the position of the boom microphone 104, i.e. bending of the boom 202 of the boom microphone 104, may be provided, when the boom microphone 104 is in its non-use position. Alternatively or in addition, the adjustment of the position of the boom microphone 104, i.e. bending of the boom 202 of the boom microphone 104, may be provided during the rotating movement of the boom microphone 104 provided by the rotating element 206. This allows that the boom microphone 104 may be rotated from the use position, e.g. from the front of the mouth of the user, to the non-use position, e.g. behind the neck of the user.

The above described headset 100 allows that the user of the headset 100 may simply and easily select/switch between the use of a boom microphone 104 and a skull microphone 106 depending on the use case, which in turn improves the sound quality of the microphone in different use cases. For example, the skull microphone 106 may provide the best sound quality, when e.g. breathing mask is used, and the boom microphone 104 may provide the best sound quality in many other use cases. Furthermore, the selection/switching between the boom microphone and the skull microphone may be provided without the need to attach and/or detach any microphones. The headset 100 according to the invention may be implemented or arranged to any kind of helmets, e.g. a firefighter helmet, military helmet, police helmet, etc.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A headset for a helmet, the headset comprising a speaker unit, a boom microphone and a skull microphone, wherein the headset further comprises a switch configured to activate the boom microphone or the skull microphone based on a position of the boom microphone, wherein the boom microphone comprises a rotating element enabling that the boom microphone is movable between a plurality of positions of the boom microphone, wherein the rotating element is mechanically mountable to the speaker unit or to the helmet, and wherein the headset further comprises an actuator arranged to the rotating element, wherein when the boom microphone is in a use position, the actuator is far from the switch arranged to the speaker unit and the switch is in its first state, thereby causing that the switch is configured to connect a ground or signal of the boom microphone and disconnect the ground or signal of the skull microphone, respectively, to activate the boom microphone and deactivate the skull microphone, and when the boom microphone is in a non-use position, the actuator is in a close vicinity to the switch and the switch is in its second state, thereby causing that the switch is configured to disconnect the ground or signal of the boom microphone and connect the ground or signal of the skull microphone, respectively, to deactivate the boom microphone and activate the skull microphone.

2. The headset according to claim 1, wherein the switch is configured to:

activate the boom microphone and simultaneously deactivate the skull microphone, when the boom microphone is arranged to a use position, and deactivate the boom microphone and simultaneously activate the skull microphone, when the boom microphone is arranged to a non-use position.

3. The headset according to claim 1, wherein the switch is a reed switch and the actuator is a magnet.

4. The headset according to claim 1, wherein the switch is an electromechanical switch, an optomechanical switch, or a mechanical switch, such as a micro switch or opto-switch, and the actuator is a mechanical actuator.

5. The headset according to claim 1, wherein the boom microphone comprises a boom having a microphone arranged in its far end.

6. The headset according to claim 1, wherein the boom microphone is detachably mounted to the speaker unit or the helmet with mechanical coupling means.

7. The headset according to claim 1, wherein the skull microphone is fixedly coupled to the speaker unit.

8. A helmet comprising the headset according to claim 1.

* * * * *